(No Model.)
W. C. SMITH & W. L. HUNTER.
PACK SADDLE.
No. 294,925. Patented Mar. 11, 1884.
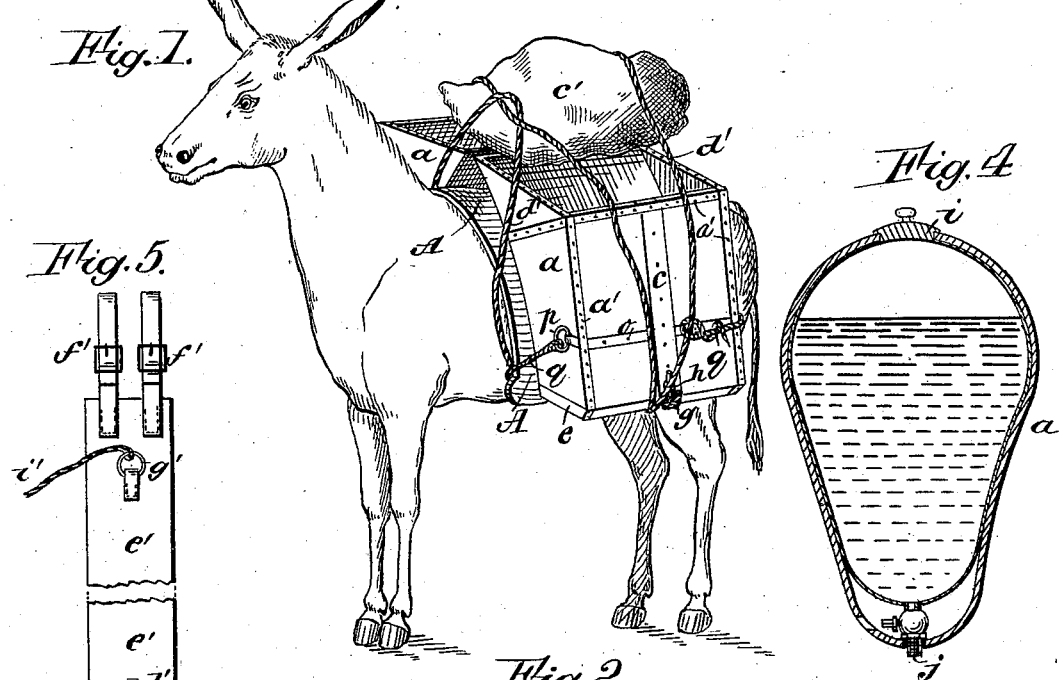
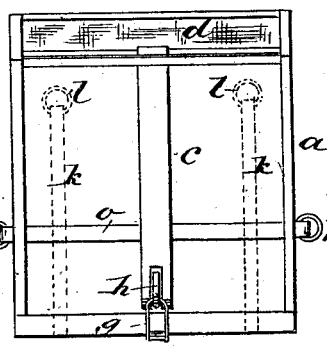
WITNESSES:
INVENTOR:
W. C. Smith
W. L. Hunter
BY
Munn & Co.
ATTORNEYS.

UNITED STATES PATENT OFFICE.

WILLIAM C. SMITH AND WILLIAM L. HUNTER, OF LONE PINE, CALIFORNIA; SAID SMITH ASSIGNOR TO SAID HUNTER.

PACK-SADDLE.

SPECIFICATION forming part of Letters Patent No. 294,925, dated March 11, 1884.

Application filed June 22, 1883. (No model.)

*To all whom it may concern:*

Be it known that we, WILLIAM C. SMITH and WILLIAM L. HUNTER, of Lone Pine, in the county of Inyo and State of California, have invented certain new and useful Improvements in Pack-Boxes, of which the following is a full, clear, and exact description.

Our invention consists of improved pack-boxes designed to be used in lieu of the sack now employed for transporting ores, water, and other matters on pack-animals, the said boxes being contrived for being filled and emptied without removing them from the animals, and being provided with means for substantial and durable connection to the pack-saddle employed for mounting the boxes on the animals, all as hereinafter fully described.

Reference is to be had to the accompanying drawings, forming part of this specification, in which similar letters of reference indicate corresponding parts in all the figures.

Figure 1 is a perspective view of the apparatus arranged on the animal's back, together with an extra package mounted on the boxes. Fig. 2 is an elevation of the ore-boxes as they appear in front or rear view, one of the boxes being partly in section. Fig. 3 is a side elevation of one of the boxes. Fig. 4 is a sectional elevation of a box of our contrivance adapted for carrying water. Fig. 5 is a plan view of an improved girth of our contrivance for use in securing the pack-saddle, with the boxes and other packages, on the animal; and Fig. 6 is a perspective view of an improved form of hook we use on the girth.

For carrying ore we make strong boxes $a$, of wood, open at the top, and lined with thin sheet metal when required, said boxes being of suitable dimensions, according to the size and strength of the animals to be used and the weight of the substance to be carried, with the back or inside $b$ suitably curved for conformity to the shape of the pack-saddle or "aparajo" on the animal's body, to bear well thereon, so as to distribute the pressure evenly without discomfort to the animal—the front side, $c$, being vertical, or thereabout, and the top, $d$, level, or nearly so, and the bottom consisting of a door or gate, $e$, that is hinged at $f$, to be let down to open the box and discharge the contents without removing it, and being provided with a hasp, $g$, by which it is to be drawn up tightly and fastened by an eccentric hook, $h$, suitably fitted on the front side of the box. In case we require the boxes for carrying water, we make them substantially of the same shape, but closed at top and bottom, with an opening, $i$, fitted with a cover for filling, and provided with a faucet, $j$, at the bottom, for drawing off the water, the faucet being preferably constructed for screwing on a hose. To the boxes thus contrived we attach a strap, $k$, at the back, a short distance below the upper end, by rings $l$, said strap being to connect the boxes at each side to the back-strap $m$, to sling them over the top of the pack-saddle A, and to the front side of the boxes, near the lower end, we attach a strap, $o$, with a ring, $p$, at each end, projecting at the corners, suitable for the connection of the cords $q$, which we stretch around under the lower corner of the pack-saddle through the loop $f'$ in the girth or cench $c'$, that passes under the animal's belly, the cord being brought up around the other corner of the pack-saddle on the same side of animal, and attached to the other ring, $p$, of the same box. The boxes $a$ are to be suitably bound and strengthened by strap-iron strips $a'$, nailed or riveted on, as required, for substantial construction. The boxes are to be marked inside with a measure-scale, $b'$, so that after a few cargoes have been weighed the packer can readily approximate the weight of the load, and also see that each box contains an equal amount.

In Fig. 1 we have represented an extra package, $c'$, secured on the top of our improved pack-boxes by the usual method of securing such packages with the cord or riata $d'$ of the girth of the common contrivance, said figure showing the advantages of our improved form of boxes, which, being flat on the top and so shaped on the inside that the upper corners approach each other closely, afford a table or platform well adapted for loading on such extra parcels.

In Figs. 2 and 5 we represent a girth, $e'$, which goes under the animal's belly for lashing the pack-saddle to, and also the load carried on the pack-saddle, which girth as ordinarily contrived has simply a ring at one end and a hook at the other for connecting the lashing-rope, the rope generally being about fifty feet long and the hook being made of a forked limb of a tree. We propose to attach two loops of leather straps and buckles, $f'$, to each end and the rings $g'$ $h'$, to one of which rings we attach the lashing-rope $i'$ in the usual manner, and to the other we connect a hook, $j'$, which we propose to make out of metal, making an eye, $k'$, in the same plane the bend of the hook is formed in, so that the bend will lie flat with the eye on the surface of the girth; and at the top of the eye we make another hook, $m'$, turned up from the plane of the rest, to connect with the ring $h'$, for attaching the hook to the girth; and under this upper hook we arrange a snap-spring, $l'$, of metal, for a safeguard to prevent the detaching of the hook from the ring. By using this apparatus we can dispense with the sacks commonly used, which are expensive. We can fill the packages on the animals in a little more time than it requires to fill the sacks, save the time and labor of tying or sewing the sacks, and altogether save the time and labor required to pack, unpack, and afterward unsack the goods, as is done in the usual manner of packing. In a distance of about a quarter of a mile we can double the number of trips possible to be made in a given time in the usual manner of packing.

Having thus described our invention, we claim as new and desire to secure by Letters Patent—

1. The improved pack-boxes $a$, constructed substantially in the described form, with curved inner sides, $b$, and having open tops $d$ and hinged bottoms $e$, and being adapted to be connected together and attached to a pack-saddle, substantially as described.

2. The improved pack-boxes $a$, suitably connected, and having curved sides $b$, to fit the sides of the pack-saddle, and provided with attaching-strap $k$ and rings $l$, for connection by the strap $m$ over the pack-saddle, substantially as described.

3. The improved pack-boxes $a$, having curved sides $b$, upper connections, $k$ $l$ $m$, attaching-rings $p$, and cords $q$, in combination with the pack-saddle A, substantially as described.

4. Improved pack-boxes, each provided with a filling-opening in its top, a discharge-opening at its bottom, a device for closing said discharge-opening, and means for connecting two together and attaching them to a pack-saddle, substantially as herein shown and described.

5. The combination, with the pack-saddle A, the pack-boxes $a$, and the lashing-cords, of the girth $e'$, provided with the loops $f'$, the ring $g'$, and the hook $j'$, substantially as herein shown and described.

WILLIAM C. SMITH.
WILLIAM L. HUNTER.

Witnesses for William C. Smith:
FREDERICK SMITH,
W. R. JOHNSON.

Witnesses for William L. Hunter:
JOHN W. P. LAIRD,
JOHN CROUGH.